Patented Mar. 27, 1928.

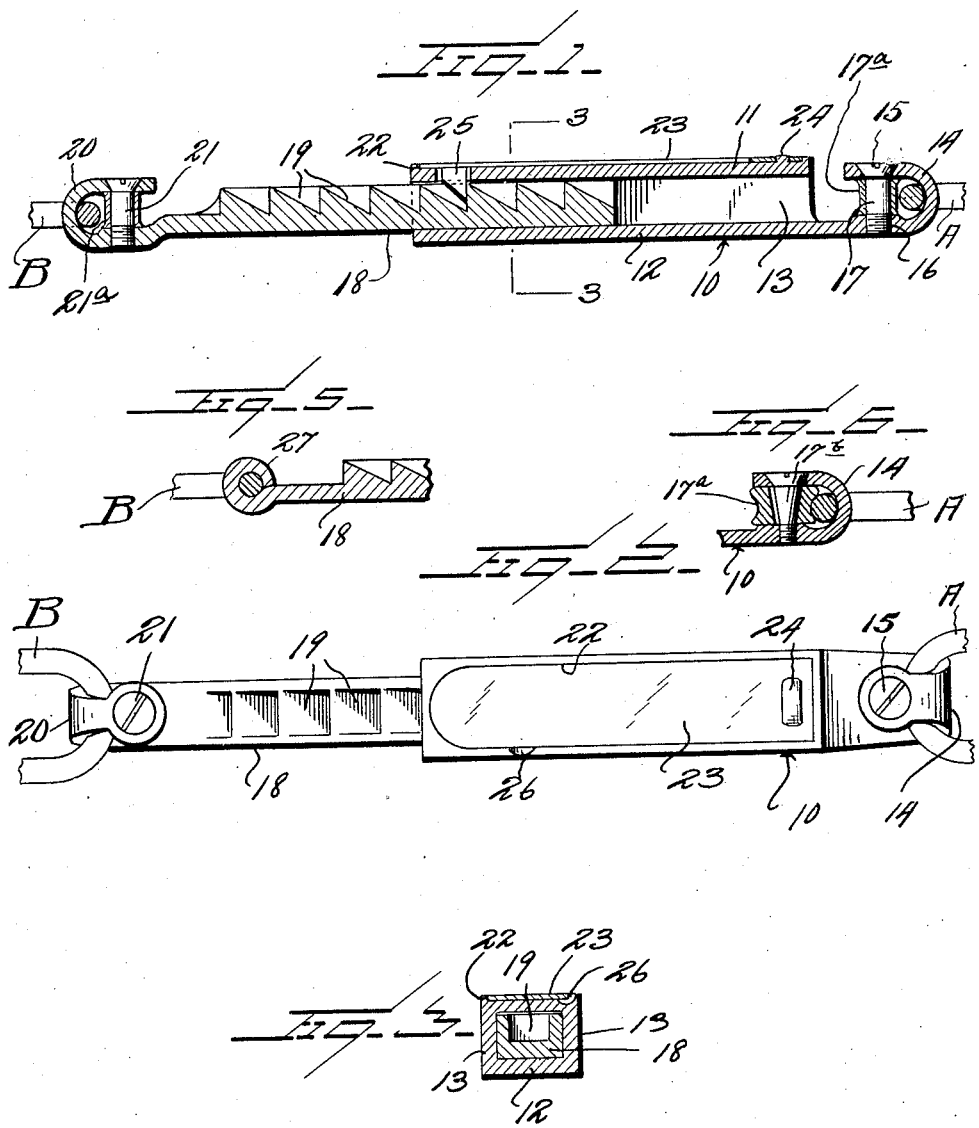

1,663,621

UNITED STATES PATENT OFFICE.

GEORGE JAMES BOWMAN, OF BARTLE, CALIFORNIA.

CHAIN TIGHTENER AND HOLDER.

Application filed March 1, 1927. Serial No. 171,844.

This invention relates to devices whereby chains may be tightened and held in a taut condition and particularly to certain improvements upon the tightener and holder for tire chains disclosed in my allowed application for patent, Serial No. 123,163, filed July 17, 1926.

The general object of the present invention is to provide a device particularly adapted for holding tire chains tightened around a wheel but not limited to such use, which device is very simple, strong, may be readily applied and readily removed, and which is so constructed that the ends of the chains cannot possibly slip off.

A further object is to provide a construction of this character so designed that it may be made particularly rigid and strong and of sizes which will permit its use under a large number of different circumstances.

Other objects will appear in the course of the following description.

My invention is illustrated in the accompanying drawings wherein:—

Figure 1 is a longitudinal sectional view of a chain tightener and holder constructed in accordance with my invention;

Fig. 2 is a plan view thereof;

Fig. 3 is a detail section on the line 3—3 of Figure 1;

Fig. 4 is a fragmentary longitudinal sectional view showing a modified means for connecting a chain link to my tightening device;

Fig. 5 is a like view to Figure 4 but showing the other end of the chain tightener with the modified form of connecting means;

Fig. 6 is a fragmentary longitudinal section showing a modified form of hook.

Referring to these drawings 10 designates a keeper which is rectangular in cross section to provide a top plate or web 11, a bottom web 12, and the sides 13. The bottom web 12 is extended beyond the side walls and the top plate 11, and bent up to form a hook 14. This hook has a countersunk aperture 15 and the bottom web immediately beneath the bill of the hook is formed with a screw-threaded aperture 16. A pin 17, screw-threaded at one end to engage in the aperture 16, is adapted to be inserted through the aperture 15 to thereby lock the link A of a chain in place on the hook 14. Preferably the pin 17 is surrounded by a relatively loose sleeve 17ª. This sleeve or washer 17ª acts to prevent the upper portion of the hook from being mashed down.

Operating through the keeper is the longitudinally shiftable member 18, the upper face of which is formed with a plurality of depressions 19 constituting ratchet teeth. The extremity of member 18 is formed with a hook 20 which extends rearward or toward the keeper 10. This hook is also formed with a countersunk aperture for the passage of a screw 21, this screw being threaded at its lower end for engagement in an aperture formed in the body of the hook beneath the bill and also surrounding this screw-threaded pin 21 is a sleeve 21ª of the same character and for the same purpose as sleeve 17ª. This hook engages the link B of the chain.

The upper face of the keeper 10 is formed with a longitudinally extending depression 22 and mounted in this depression is the spring latch or pawl 23. Preferably one end of the upper wall or web 11 has an upwardly extending integral stud 24 and the spring 23 is fitted over this stud and the stud overturned upon the spring. The fact that this spring is disposed within a depression prevents the spring from swinging laterally. The free extremity of the spring is formed with a detent tooth 25 which extends downward through an aperture in the upper web 11, this detent tooth being beveled so as to permit the inward movement of the member 11 but prevent the outward movement of this member until the spring is lifted.

For the purpose of lifting the spring I form one wall of the recess within which the spring is disposed with a depression or cut away portion 26 into which a screwdriver or tapered punch or like implement may be inserted beneath the free end of the spring to raise it.

The operation of this device will be obvious from what has gone before. When it is desired to tighten up upon the chain and draw the two ends of the chain towards each other and hold them in this position, the end links of the chain are engaged with the hooks 14 and 20 and then the members 10 and 18 are forced relatively towards each other until the chain has been sufficiently tightened. This may be accomplished, as illustrated in my prior application, by means of a chain tightening lever. As the member 18 is forced into the keeper, the tooth 25 rides over the inclined faces of the ratchet recesses 19 and locks the member 18 against reverse movement. When it is desired to disengage the chain or loosen it, the free end of the spring or pawl 23 is raised which will permit the member 18 to be readily drawn out of the keeper.

It will be understood that this tightening device is not as deep as the thickness of a chain and, therefore, will not project beyond the chain or knock.

In Figures 4 and 5 I have illustrated a modified method of connecting the parts 12 and 18 to the chain links A and B. In each case the extremity of the part 18 or the part 12 is rolled over upon the chain link so as to form a bead 27 so that in this case the chain links A and B are permanently connected to the members 12 and 18 respectively.

In Figure 6 I show a modified form of the hook shown in Figure 1 which is constructed precisely the same as either one of the hooks shown in Figure 1 except that the screw 17$^b$ is tapered and acts when it is inserted to push the sleeve 17$^a$ laterally against the link A to thus prevent any rattling caused by movement between the link and the washer.

It will be seen that the hooks 14 and 20 or the hooks 27 may be made in several different ways and this chain holder or lock may be made in any size desired or required for strength. The construction shown in Figures 1 and 2 as well as in Figures 4 and 5 is such that the collar 17$^a$ and 21$^a$ in Figure 6 will be crowded against the link so that there will be no noise, knocking or rattling. While I preferably form this collar or sleeve 17$^a$ or 21$^a$ of metal, a leather washer might be used to prevent any noise or rattling.

This construction eliminates all necessity of hooking or unhooking the chain to my locking device and inasmuch as each part is fast to the chain, the two sections of the lock cannot be lost. It will be seen that the two sections of the tightener or lock may be drawn towards each other in any manner as, for instance, a lever may be used for this purpose as is illustrated in my pending application for patent, Serial No. 123,163, filed July 17, 1926, or a pulley may be provided having a hook engageable with one of the links B and a rope rove through the pulley having a hook engaging with the other link and by pulling upon the rope the two ends of the chain may be drawn towards each other, thus sliding the two elements of my chain tightener and holder into each other. It is also possible for these hooks to be engaged directly with the eyes or hooks formed at the extremities of the holder. Any suitable means, therefore, may be used for drawing the two sections into or forcing them into contracted position.

I claim:—

1. A chain tightener and holder of the character described including a hollow, open-ended keeper, the bottom wall of the keeper being extended at one end to form a hook, a coacting member sliding through the keeper and formed with ratchet teeth, the extremity of the member being bent rearward to form a hook, and a flat spring mounted upon the one wall of the keeper and having a detent tooth passing through the said wall of the keeper and coacting with the teeth of said sliding member, the said wall of the keeper being recessed to receive said spring and one wall of the recess being cut away to permit the insertion of an implement whereby the spring may be raised.

2. A chain tightener and holder of the character described including a keeper, one end of the keeper being extended to form a returned hook, a screw passing through the bill of the hook and into the bottom wall of the keeper, a sleeve loosely surrounding the screw, a coacting member sliding through the keeper and formed with ratchet teeth, the extremity of said member being bent rearward to form a hook, a screw passing through the bill of the hook and into said member, and a sleeve surrounding said screw.

3. A chain tightener and holder of the character described including a keeper, one end of the keeper being extended to form a returned hook, a screw passing through the bill of the hook and into the bottom wall of the keeper, a sleeve loosely surrounding the screw, a coacting member sliding through the keeper and formed with ratchet teeth, the extremity of said member being bent rearward to form a hook, a screw passing through the bill of the hook and into said member, and a sleeve surrounding said screw, the screws being tapering to thereby force the sleeves toward the bight ends of the hooks.

In testimony whereof I hereunto affix my signature.

GEORGE JAMES BOWMAN.